US012643500B2

(12) United States Patent
Ando

(10) Patent No.: US 12,643,500 B2
(45) Date of Patent: Jun. 2, 2026

(54) INFORMATION PROCESSING DEVICE

(71) Applicant: SUBARU CORPORATION, Tokyo (JP)

(72) Inventor: Yusuke Ando, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 1 day.

(21) Appl. No.: 18/761,454

(22) Filed: Jul. 2, 2024

(65) Prior Publication Data

US 2025/0042360 A1 Feb. 6, 2025

(30) Foreign Application Priority Data

Aug. 1, 2023 (JP) ................................. 2023-125334

(51) Int. Cl.
*B60R 25/24* (2013.01)
*G07C 9/00* (2020.01)

(52) U.S. Cl.
CPC .......... *B60R 25/24* (2013.01); *G07C 9/00174* (2013.01); *G07C 2009/00793* (2013.01)

(58) Field of Classification Search
None
See application file for complete search history.

(56) References Cited

U.S. PATENT DOCUMENTS 4,802,201 A * 1/1989 Yoshizawa ........ H04M 1/72508
455/574
5,406,275 A * 4/1995 Hassett ................. G01S 13/765
340/928

8,976,004 B2 * 3/2015 Matsumoto ............. B60R 16/00
340/5.61
11,320,513 B2 * 5/2022 Kusumoto ............ G01S 5/0289
2006/0061452 A1 * 3/2006 Nagayama ............. G06K 17/00
340/10.5
2009/0289831 A1 * 11/2009 Akita ...................... G01S 13/18
342/70
2010/0244560 A1 * 9/2010 Sato ........................ B60R 16/03
307/10.1
2015/0246657 A1 * 9/2015 Tomita .................. B60R 25/209
701/2
2016/0232727 A1 * 8/2016 Wang .................. G07C 9/00309
2016/0297397 A1 * 10/2016 Ko .......................... B60R 25/24

(Continued)

FOREIGN PATENT DOCUMENTS

JP 2017-223019 A 12/2017

*Primary Examiner* — Carlos Garcia
(74) *Attorney, Agent, or Firm* — TROUTMAN PEPPER LOCKE LLP

(57) ABSTRACT

An information processing device includes a first transmitter, one or more processors, and a recording medium. The first transmitter is configured to transmit first key-identifying information using a radio-frequency electromagnetic wave having a predetermined frequency, the first key-identifying information being linked to a predetermined vehicle. The recording medium stores a program configured to be executed by the one or more processors. The program includes one or more instructions configured to cause the one or more processors to perform a process to stop the first transmitter from transmitting the first key-identifying information when it is determined that the radio-frequency electromagnetic wave having the predetermined frequency has increased in intensity.

13 Claims, 7 Drawing Sheets

(56) References Cited

U.S. PATENT DOCUMENTS

| | | | |
|---|---|---|---|
| 2016/0375861 A1* | 12/2016 | Miyazawa | B60R 25/245 |
| | | | 701/2 |
| 2019/0035192 A1* | 1/2019 | Hanson | G07C 9/00309 |
| 2019/0248328 A1* | 8/2019 | Eriksen | G07C 9/00309 |
| 2021/0281457 A1* | 9/2021 | Eger | H04W 72/23 |
| 2021/0367667 A1* | 11/2021 | Byun | H04B 10/07955 |
| 2025/0370000 A1* | 12/2025 | Rosingana | G01P 15/0802 |

* cited by examiner

INFORMATION PROCESSING DEVICE

CROSS-REFERENCE TO RELATED APPLICATION

The present application claims priority from Japanese Patent Application No. 2023-125334 filed on Aug. 1, 2023, the entire contents of which are hereby incorporated by reference.

BACKGROUND

The disclosure relates to a technology for an information processing device serving as a portable device configured to lock and unlock a vehicle door by emitting a radio-frequency electromagnetic wave containing unique identifying information for each key.

Some portable electronic keys capable of locking and unlocking a vehicle have a smart entry function.

In a vehicle system having a smart entry function, a weak electromagnetic wave emitted by a vehicle or an electronic key may be amplified by a relay device, and an electronic key located too far to lock or unlock a vehicle in a normal condition may be falsely recognized to be located near the vehicle.

This false recognition allows the vehicle door to be unlocked and the engine to start, and the vehicle may be stolen.

To avoid such inconvenience, Japanese Unexamined Patent Application Publication (JP-A) No. 2017-223019 discloses a technology for installing a theft-prevention device separately from an electronic key and causing a vehicle-mounted device to recognize a signal transmitted by the electronic key as noise.

SUMMARY

An aspect of the disclosure provides an information processing device including a first transmitter, one or more processors, and a recording medium. The first transmitter is configured to transmit first key-identifying information using a radio-frequency electromagnetic wave having a predetermined frequency, the first key-identifying information being linked to a predetermined vehicle. The recording medium stores a program configured to be executed by the one or more processors. The program includes one or more instructions configured to cause the one or more processors to perform a process to stop the first transmitter from transmitting the first key-identifying information when it is determined that the radio-frequency electromagnetic wave having the predetermined frequency has increased in intensity.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

In the technology disclosed in JP-A No. 2017-223019, since signal transmission from an electronic key continues, theft cannot be prevented if the effect of a theft-prevention device is nullified by some method.

It is desirable to provide a way to reduce the possibility of a vehicle being stolen.

Hereinafter, vehicle systems according to embodiments of the disclosure will be described with reference to the attached drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
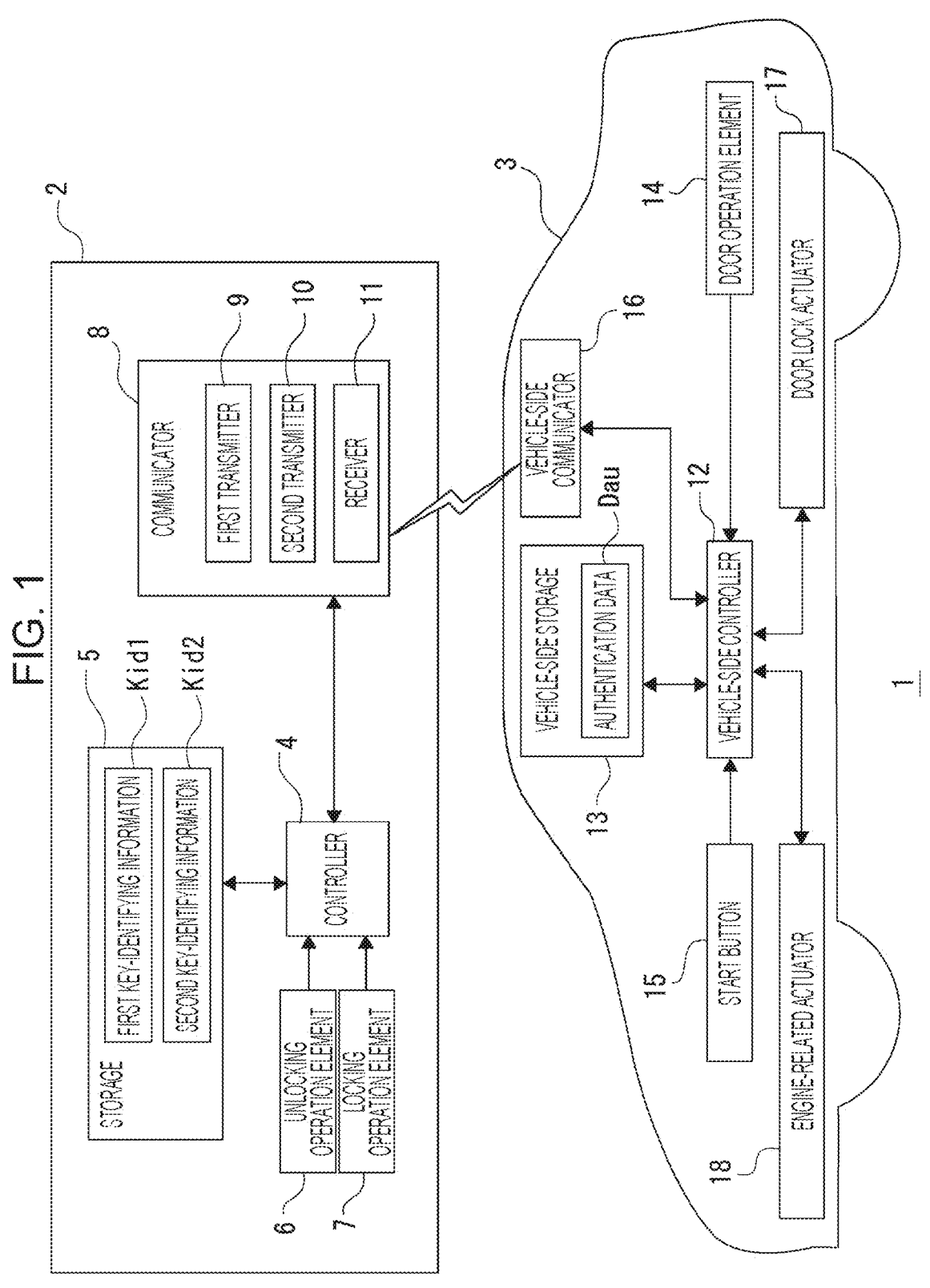
FIG. 1 illustrates an example of a configuration of a vehicle system according to an embodiment.

FIG. 1 illustrates an example of a configuration of a vehicle system 1 according to a first embodiment of the disclosure. FIG. 1 illustrates major constituents related to the embodiment of the disclosure that are extracted from the constituents of the vehicle system 1.

The vehicle system 1 includes a smart key 2 and a vehicle 3. The smart key 2 may serve as an information processing device in one embodiment.

The smart key 2 includes a master key 2*m* and a subsidiary key 2*s*, but these keys are not distinguished from each other in the following description and are collectively referred to as the smart key 2.

The smart key 2 is a device (information processing device) carried by a person such as a driver as a key for locking and unlocking the door of the vehicle 3 by remote control.

The smart key 2 includes a controller 4, a storage 5, an unlocking operation element 6, a locking operation element 7, and a communicator 8.

The controller 4 is configured to perform various processes based on a user's operation on the smart key 2 and communication with the vehicle 3.

The storage 5 collectively represents components such as a read only memory (ROM) configured to store a program to be executed by the controller 4 and a random access memory (RAM) to be used as a work area. The controller 4 may include a part of the storage 5.

The controller 4 and the storage 5 are formed, for example, as a single integrated circuit (IC) chip.

The storage 5 stores first key-identifying information Kid1 and second key-identifying information Kid2.

The unlocking operation element 6 is an operation element such as a button to be operated to unlock the door of the vehicle 3. The unlocking operation element 6 is configured to provide the controller 4 with an operation signal in response to an operation on the unlocking operation element 6.

The controller 4 is configured to cause a predetermined unlocking signal to be transmitted via wireless communication in response to the operation signal received from the unlocking operation element 6.

The locking operation element 7 is an operation element such as a button to be operated to lock the door of the vehicle 3. The locking operation element 7 is configured to provide the controller 4 with an operation signal in response to an operation on the locking operation element 7.

The controller 4 is configured to cause a predetermined locking signal to be transmitted via wireless communication in response to the operation signal received from the locking operation element 7.

The communicator 8 includes a first transmitter 9, a second transmitter 10, and a receiver 11.

The first transmitter 9 is configured to emit a signal containing common data CD and the first key-identifying information Kid1 on a weak electromagnetic wave. The signal emitted from the first transmitter 9 in this process is referred to as a "proper signal S1".

The range covered with the proper signal S1 is about 1 to several meters from the smart key 2.

The second transmitter 10 is configured to emit a signal containing the common data CD and the second key-identifying information Kid2 on a weak electromagnetic wave. The signal emitted from the second transmitter 10 in this process is referred to as a "fake signal S2".

The range covered with the fake signal S2 is about 1 to several meters from the smart key 2.

The common data CD contained in both the proper signal S1 and the fake signal S2 contains, for example, information regarding the manufacturer and the type of the vehicle 3 and is the same for different vehicles as long as the type of a vehicle is the same.

The first key-identifying information Kid1 contained in the proper signal S1 is the identifying information assigned to the smart key 2 with which the corresponding vehicle 3 may be operated by remote control.

The second key-identifying information Kid2 contained in the fake signal S2 is the identifying information for which no corresponding vehicle 3 exists, and none of the vehicles 3 at least from the same manufacturer and of the same type is allowed to be operated by remote control based on this identifying information.

In short, the fake signal S2 contains the same information as the proper signal S1 except the key-identifying information.

The proper signal S1 and the fake signal S2 are transmitted in the same frequency range. The predetermined frequency used to transmit the proper signal S1 and the fake signal S2 is referred to as a "first frequency f1".

It is assumed that the proper signal S1 and the fake signal S2 are continuously emitted regardless of the control by the controller 4. Alternatively, the proper signal S1 and the fake signal S2 may be continuously emitted after the control by the controller 4 starts.

The emission of the proper signal S1 is allowed to stop by the control by the controller 4 when there is a possibility of a theft.

The first transmitter 9 or the second transmitter 10 may be allowed to transmit the unlocking signal when the unlocking operation element 6 is operated and transmit the locking signal when the locking operation element 7 is operated. The ranges covered with the unlocking signal and the locking signal are designed to be larger than, for example, the ranges covered with the proper signal S1 and the fake signal S2 and are set to, for example, from 10 meters up to several tens of meters.

The communicator 8 may include another transmitter, which is not illustrated, configured to transmit the unlocking signal and the locking signal.

The receiver 11 is capable of receiving a radio-frequency electromagnetic wave in a predetermined frequency range including the first frequency f1 used for transmitting the proper signal S1 and the fake signal S2.

The controller 4 is capable of measuring or acquiring the intensity of the electromagnetic wave received by the receiver 11.

The configuration of the vehicle 3 will be described herein.

The vehicle 3 includes a vehicle-side controller 12, a vehicle-side storage 13, a door operation element 14, a start button 15, a vehicle-side communicator 16, a door lock actuator 17, and an engine-related actuator 18.

The vehicle-side controller 12 is configured to perform various processes in response to a result of receiving a signal transmitted from the smart key 2 or in response to a user's operation on the vehicle 3.

The vehicle-side storage 13 collectively represents components such as a ROM configured to store a program to be executed by the vehicle-side controller 12 and a RAM to be used as a work area. The vehicle-side controller 12 may include a part of the vehicle-side storage 13.

The vehicle-side controller 12 and the vehicle-side storage 13 may be mounted on the vehicle 3 as one or more electronic control units (ECUs).

The vehicle-side storage 13 stores authentication data Dau for authenticating a signal emitted from the smart key 2 properly corresponding to the vehicle 3. The authentication data Dau is designed to be used to determine whether the key-identifying information Kid contained in the proper signal S1 is correct, that is, whether the proper signal S1 contains the first key-identifying information Kid1.

The door operation element 14 is an operation element such as a button disposed at a door handle of the vehicle 3 and is configured to detect an operation on the door operation element 14 and provide the vehicle-side controller 12 with an operation signal.

The start button 15 is an operation element such as a button disposed near the steering wheel of the vehicle 3 and is configured to detect an operation on the start button 15 and provide the vehicle-side controller 12 with an operation signal.

The vehicle-side communicator 16 includes a transmitter and a receiver that are not illustrated and is capable of receiving at least wireless communication at the first frequency f1.

In response to receiving an operation signal from the door operation element 14, the vehicle-side controller 12 performs a determination as to whether the vehicle-side communicator 16 is receiving the proper signal S1 described above and drives the door lock actuator 17 based on the result of the determination.

The door lock actuator 17 is used to switch between the unlocked and locked states of the door of the vehicle 3 and is formed by an actuator such as a motor for driving a locking mechanism of the door.

When the door operation element 14 is operated while the door of the vehicle 3 is in the locked state, the vehicle-side controller 12 drives the door lock actuator 17 to switch from the locked state to the unlocked state.

When the door operation element 14 is operated while the door of the vehicle 3 is in the unlocked state, the vehicle-side controller 12 drives the door lock actuator 17 to switch from the unlocked state to the locked state.

Note that the door operation element 14 may be configured to be used to either unlock or lock the door of the vehicle 3.

In response to receiving an operation signal from the start button 15, the vehicle-side controller 12 performs a determination as to whether the vehicle-side communicator 16 is receiving the proper signal S1 described above and drives the engine-related actuator 18 based on the result of the determination.

The engine-related actuator 18 collectively represents various actuators related to the engine of the vehicle 3. Examples of the engine-related actuator 18 include a throttle actuator configured to drive a throttle valve, an injector configured to inject fuel, and a starter used to start the engine.

In response to receiving an operation signal from the start button 15 while the vehicle-side communicator 16 is receiving the proper signal S1 described above, the vehicle-side controller 12 performs a process to start the engine.

The above description applies to the vehicle 3 being an engine-driven vehicle, and if the vehicle 3 is an electric vehicle, the vehicle-side controller 12 is configured to control various actuators instead of the engine-related actuator 18 to make the electric vehicle ready to start.

1-2 Control for Theft Protection

The controller 4 in the smart key 2 is configured to perform control to protect the vehicle 3 corresponding to the smart key 2 from theft.

Figure 2:
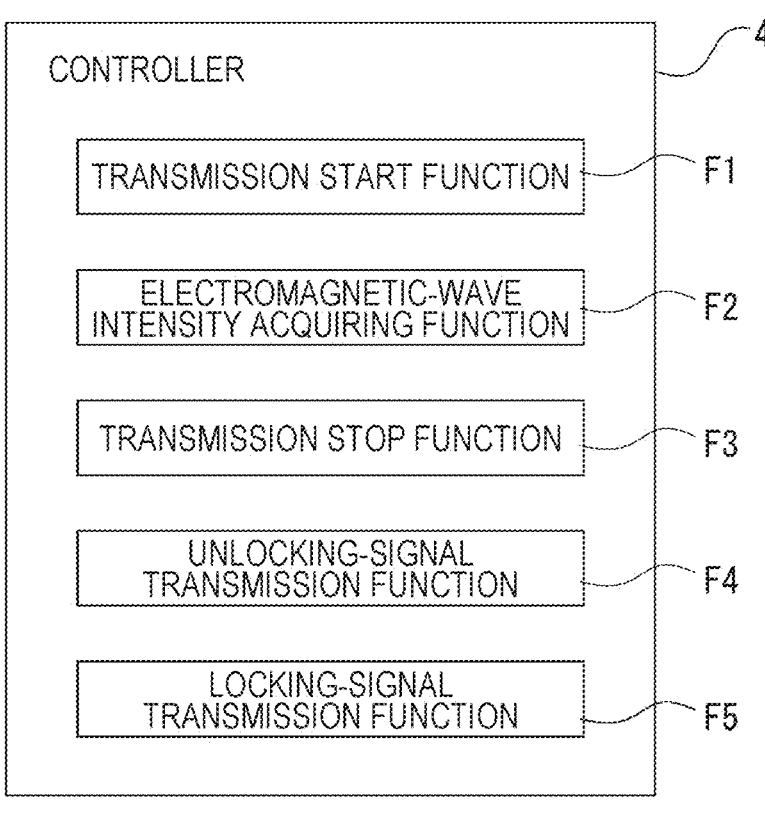
FIG. 2 is a block diagram illustrating functions implemented in a controller in a smart key.

FIG. 2 illustrates functions implemented in the controller 4.

The controller 4 is configured to execute the program stored in the storage 5, and thereby a transmission start function F1, an electromagnetic-wave intensity acquiring function F2, a transmission stop function F3, an unlocking-signal transmission function F4, and a locking-signal transmission function F5 are implemented in the controller 4.

The transmission start function F1 is configured to both cause the first transmitter 9 to start transmitting the proper signal S1 and cause the second transmitter 10 to start transmitting the fake signal S2.

The time to start transmitting the proper signal S1 may differ from the time to start transmitting the fake signal S2. If both the signals are transmitted at the same time, the vehicle 3 is not able to separate the proper signal S1 from a mixture of the proper signal S1 and the fake signal S2 upon receiving the mixture, and, for example, there is a possibility that the door of the vehicle 3 remains locked.

The electromagnetic-wave intensity acquiring function F2 is configured to acquire the intensity of the received electromagnetic wave measured at the first frequency f1. The receiver 11 may measure the intensity of the received electromagnetic wave, or the controller 4 may measure the intensity of the received electromagnetic wave based on a signal that is output from the receiver 11.

The transmission stop function F3 is configured to stop the first transmitter 9 from transmitting the proper signal S1 when the intensity of the received electromagnetic wave is high at the first frequency f1. The transmission stop function F3 is configured not to stop the second transmitter 10 from transmitting the fake signal S2.

Examples of a case where the intensity of the received electromagnetic wave is high at the first frequency f1 include a case where a person attempting theft is relaying or amplifying a weak electromagnetic wave emitted from the smart key 2.

Since the transmission stop function F3 stops the transmission of the proper signal S1 when the intensity of the received electromagnetic wave is high at the first frequency f1, a signal that does not contain the first key-identifying information Kid1 is relayed or amplified thereafter, leading to difficulties in unlocking the door and starting the engine of the vehicle 3 using a so-called relay attack.

There are multiple ways to determine whether the intensity of the received electromagnetic wave is high.

In one method, a threshold with which comparison is made is stored, for example, in the storage 5, and the transmission stop function F3 determines whether the intensity of the received electromagnetic wave is high by comparing the acquired intensity of the received electromagnetic wave with the threshold.

The threshold to be used in this comparison may be set based on the intensity of the received electromagnetic wave measured when the proper signal S1 and the fake signal S2 are received without being relayed or amplified. When the threshold is set, a certain amount of margin may be included in consideration of such factors as deterioration of devices over time and a receiving environment.

In another method, the current intensity of the received electromagnetic wave is compared with the intensity of the received electromagnetic wave a predetermined time earlier, and it is determined that the intensity of the received electromagnetic wave is high when the received electromagnetic wave has increased in intensity by a predetermined amount or more.

When the intensity of the received electromagnetic wave is high, the transmission of the proper signal S1 may be stopped, for example, for a predetermined time such as several minutes, several tens of minutes, or several hours or may be stopped until it is determined that the intensity of the received electromagnetic wave is not high any more.

The intensity of the received electromagnetic wave at the first frequency f1 also sometimes becomes high when other devices use the same frequency range. In such a case, it is unnecessary for the transmission stop function F3 to stop the transmission of the proper signal S1.

To avoid an unnecessary stop of the transmission of the proper signal S1, the transmission stop function F3 may determine whether a high-intensity signal received by the receiver 11 contains the first key-identifying information Kid1 or the second key-identifying information Kid2.

The transmission stop function F3 causes the transmission of the proper signal S1 to stop when the intensity of the received electromagnetic wave is determined to be high at the first frequency f1 and one or more of the first key-identifying information Kid1 and the second key-identifying information Kid2 are contained in a signal on the electromagnetic wave that has high intensity when received.

Consequently, the transmission of the proper signal S1 may be stopped while the possibility of being subjected to a relay attack is high.

The unlocking-signal transmission function F4 is configured to transmit an unlocking signal on a radio-frequency electromagnetic wave in response to an input of a signal indicating that the unlocking operation element 6 is operated.

The locking-signal transmission function F5 is configured to transmit a locking signal on a radio-frequency electromagnetic wave in response to an input of a signal indicating that the locking operation element 7 is operated.

1-3 Process Flow

Description will be given with reference to FIG. 3 with regard to an example of a process performed by the controller 4 in the smart key 2.

The controller 4 causes the transmission of the proper signal S1 and the fake signal S2 to start in step S101.

The controller 4 acquires the data regarding the intensity of the received electromagnetic wave having the first frequency f1 in step S102.

In step S103, the controller 4 performs a determination as to whether the intensity of the received electromagnetic wave is high based on the acquired data regarding the intensity of the received electromagnetic wave. In this determination, for example, the data regarding the intensity of the received electromagnetic wave may be compared with a threshold, or two pieces of data regarding the current and the past intensities of the received electromagnetic waves may be compared with each other.

Upon determining that the intensity of the received electromagnetic wave is not high, the controller 4 returns to step S102. In other words, the controller 4 repeats processes in step S102 and step S103 alternately in a normal condition.

In contrast, upon determining that the intensity of the received electromagnetic wave is high, the controller 4 performs a process to stop transmitting the proper signal S1 in step S104.

Then, the controller 4 determines in step S105 whether the condition for resuming the transmission of the proper signal S1 is satisfied. Examples of the condition for resuming the transmission include a time that elapses after the process in step S104 is performed and the intensity of the received electromagnetic wave.

Upon determining that the condition for resuming the transmission is not satisfied, the controller 4 repeats the process in step S105.

In contrast, upon determining that the condition for resuming the transmission is satisfied, the controller 4 causes the transmission of the proper signal S1 to resume in step S106. This process is performed, for example, by the transmission start function F1 in the controller 4.

A vehicle system 1A according to a second embodiment includes a smart key 2A, a vehicle 3, and an auxiliary device 19.

Figure 4:
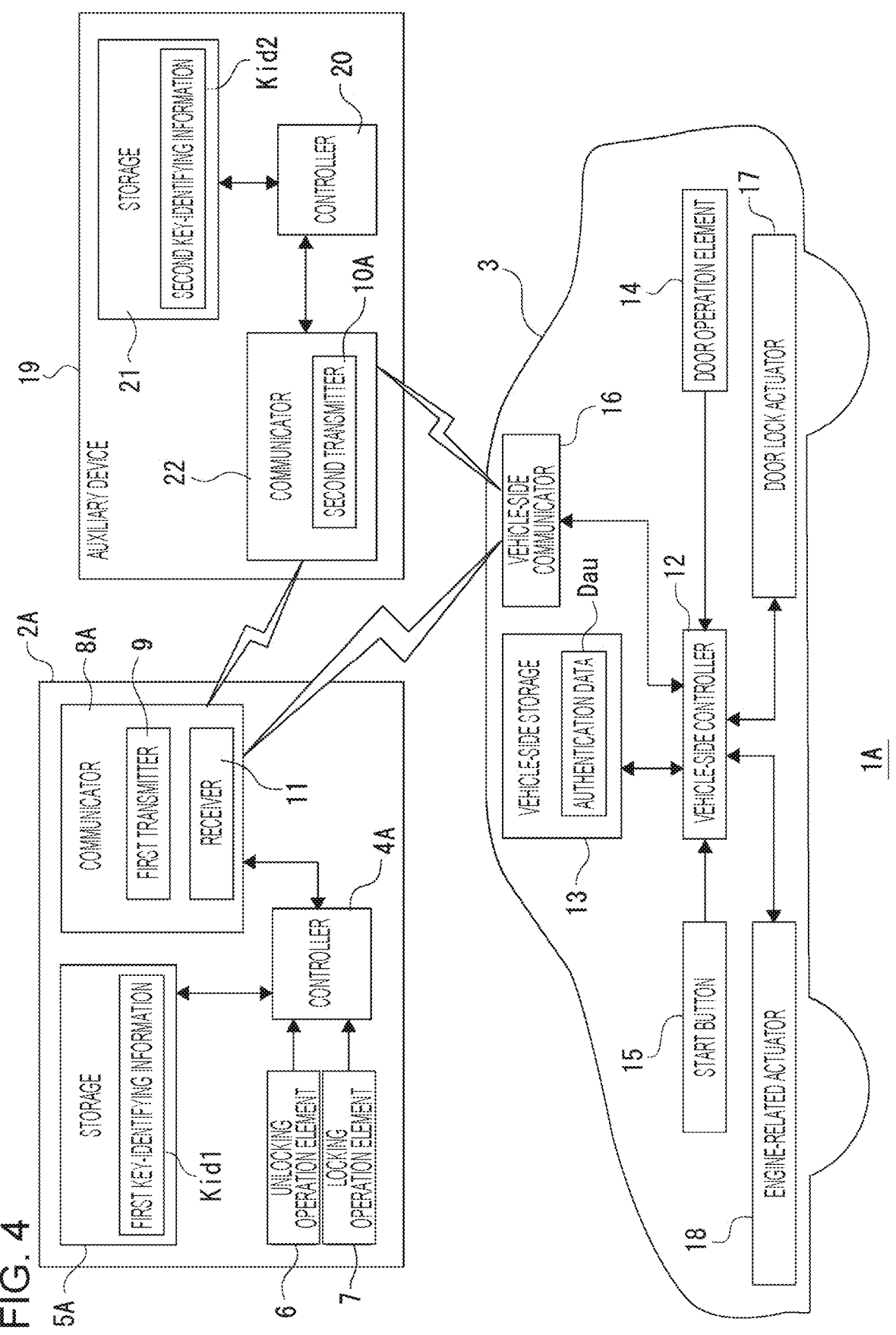
FIG. 4 illustrates an example of a configuration of a vehicle system according to an embodiment.

An example of a configuration of the vehicle system 1A will be described with reference to FIG. 4. Constituents that are the same as or similar to the constituents in the first embodiment are denoted by the same signs, and descriptions with regard to such constituents will be omitted as appropriate.

The smart key 2A includes a controller 4A, a storage 5A, an unlocking operation element 6, a locking operation element 7, and a communicator 8A.

The communicator 8A includes a first transmitter 9 and a receiver 11 but not a second transmitter 10.

Namely, the communicator 8A is capable of transmitting a proper signal S1 but incapable of transmitting a fake signal S2.

Accordingly, the storage 5A stores first key-identifying information Kid1 and not second key-identifying information Kid2.

As depicted in FIG. 2, a transmission start function F1, an electromagnetic-wave intensity acquiring function F2, a transmission stop function F3, an unlocking-signal transmission function F4, and a locking-signal transmission function F5 are implemented in the controller 4A.

The transmission start function F1 is configured to start the first transmitter 9 transmitting the proper signal S1.

The electromagnetic-wave intensity acquiring function F2, the transmission stop function F3, the unlocking-signal transmission function F4, and the locking-signal transmission function F5 serve in the same manner as or similarly to those in the first embodiment, and duplicate description will be omitted.

The function of transmitting the fake signal S2, which is not implemented in the smart key 2A, is implemented in the auxiliary device 19 instead. The auxiliary device 19 may be carried together with the smart key 2A, and, for example, the smart key 2A and the auxiliary device 19 are hung from the same key ring and carried.

The auxiliary device 19 includes a controller 20, a storage 21, and a communicator 22.

Figure 5:
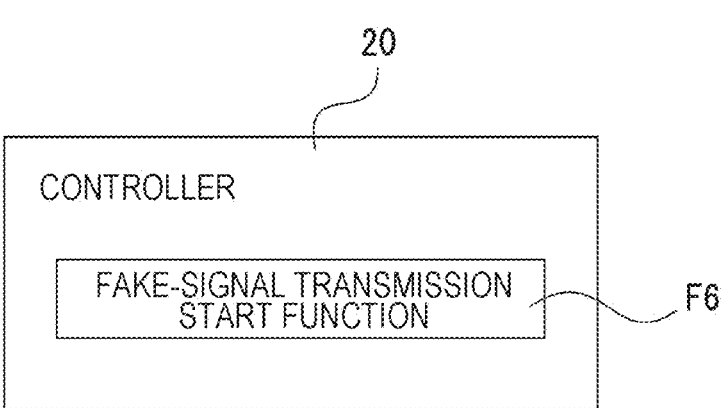
FIG. 5 is a block diagram illustrating a function implemented in a controller in an auxiliary device according to the embodiment.

A fake-signal transmission start function F6 is implemented in the controller 20 to transmit the fake signal S2 (refer to FIG. 5).

The storage 21 collectively represents components such as a ROM configured to store a program to be executed by the controller 20 and a RAM to be used as a work area. The controller 20 may include a part of the storage 21.

The controller 20 and the storage 21 are formed, for example, as a single IC chip.

The storage 21 stores the second key-identifying information Kid2 to be used to transmit the fake signal S2.

The communicator 22 includes a second transmitter 10A. The second transmitter 10A is controlled by the controller 20 and is configured to continuously output the fake signal S2 containing the second key-identifying information Kid2.

Namely, in the vehicle system 1A according to the second embodiment, not only the proper signal S1 is transmitted from the smart key 2A but also the fake signal S2 is transmitted from the auxiliary device 19, leading to a block to a relay attack.

Figure 3:
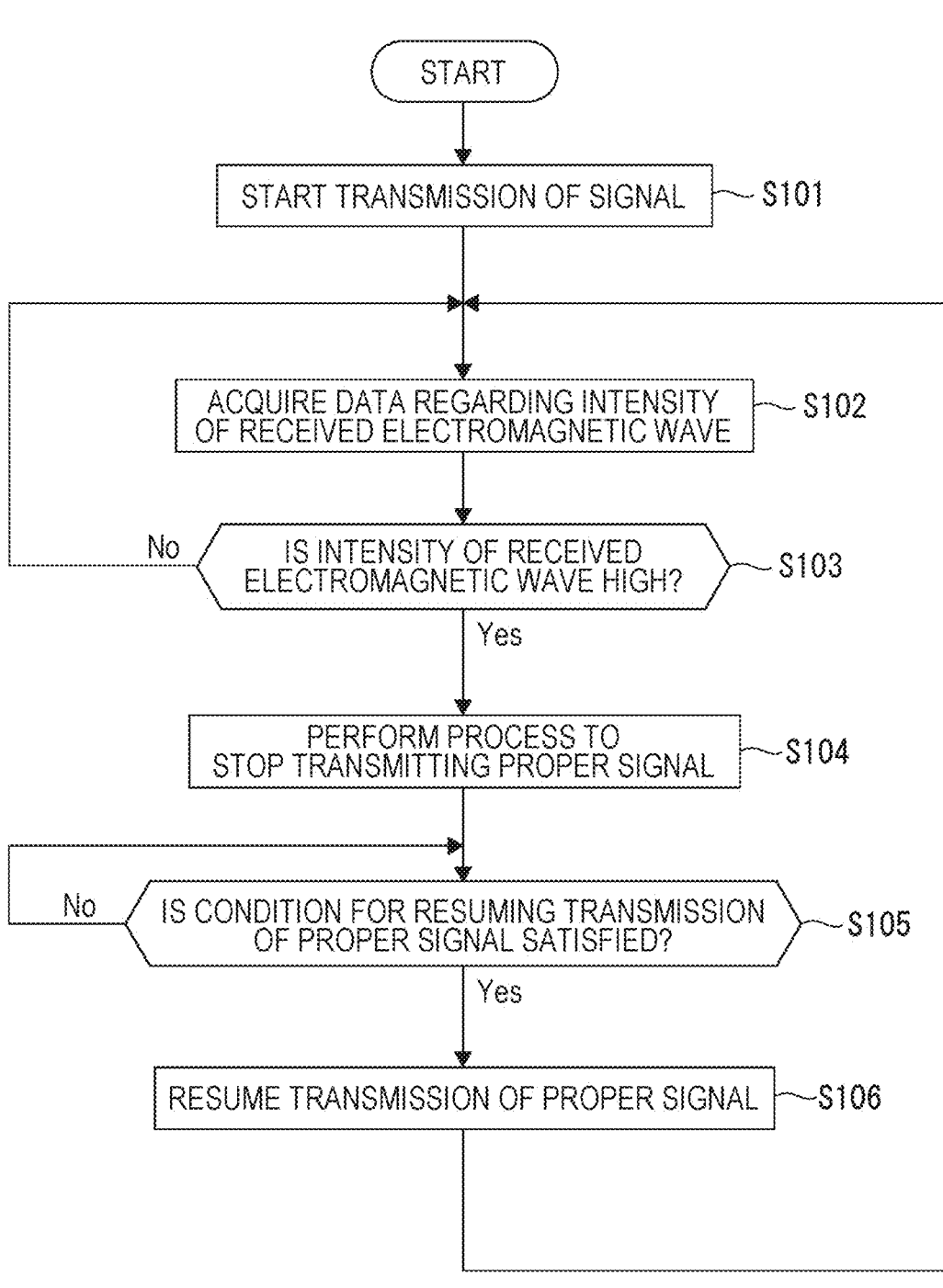
FIG. 3 is a flowchart illustrating an example of a process performed by the controller in the smart key.

The process to be performed by the controller 4A according to the second embodiment is the same as or similar to the process illustrated in FIG. 3. Note that the controller 4A performs a process to cause the transmission of the proper signal S1 alone to start in step S101.

Figure 6:
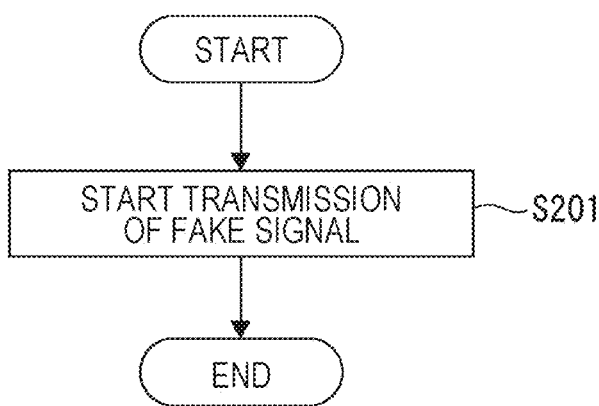
FIG. 6 is a flowchart illustrating an example of a process performed by the controller in the auxiliary device according to the embodiment.

FIG. 6 illustrates an example of a process performed by the auxiliary device 19.

The controller 20 in the auxiliary device 19 performs a process to cause the transmission of the fake signal S2 to start in step S201 in FIG. 6.

Consequently, the second transmitter 10A in the auxiliary device 19 starts transmitting the fake signal S2.

In the vehicle system 1A according to the embodiment, since the smart key 2A and the auxiliary device 19 are separated from each other, it is unnecessary to implement the function of transmitting the fake signal S2 in the smart key 2A.

Accordingly, the cost of the smart key 2A may be reduced. For example, a fee charged to repair the smart key 2A malfunctioning is reduced.

In addition, when the vehicle 3 is replaced with another vehicle 3 from the same manufacturer and of the same type, the smart key 2A is replaced with another smart key corresponding to the other vehicle 3, but the auxiliary device 19, which is separated from the smart key 2A, may continue to be used without a change.

Thus, the cost may be reduced.

A vehicle system 1B according to a third embodiment includes a smart key 2B, a vehicle 3, and an auxiliary device 19B.

Figure 7:
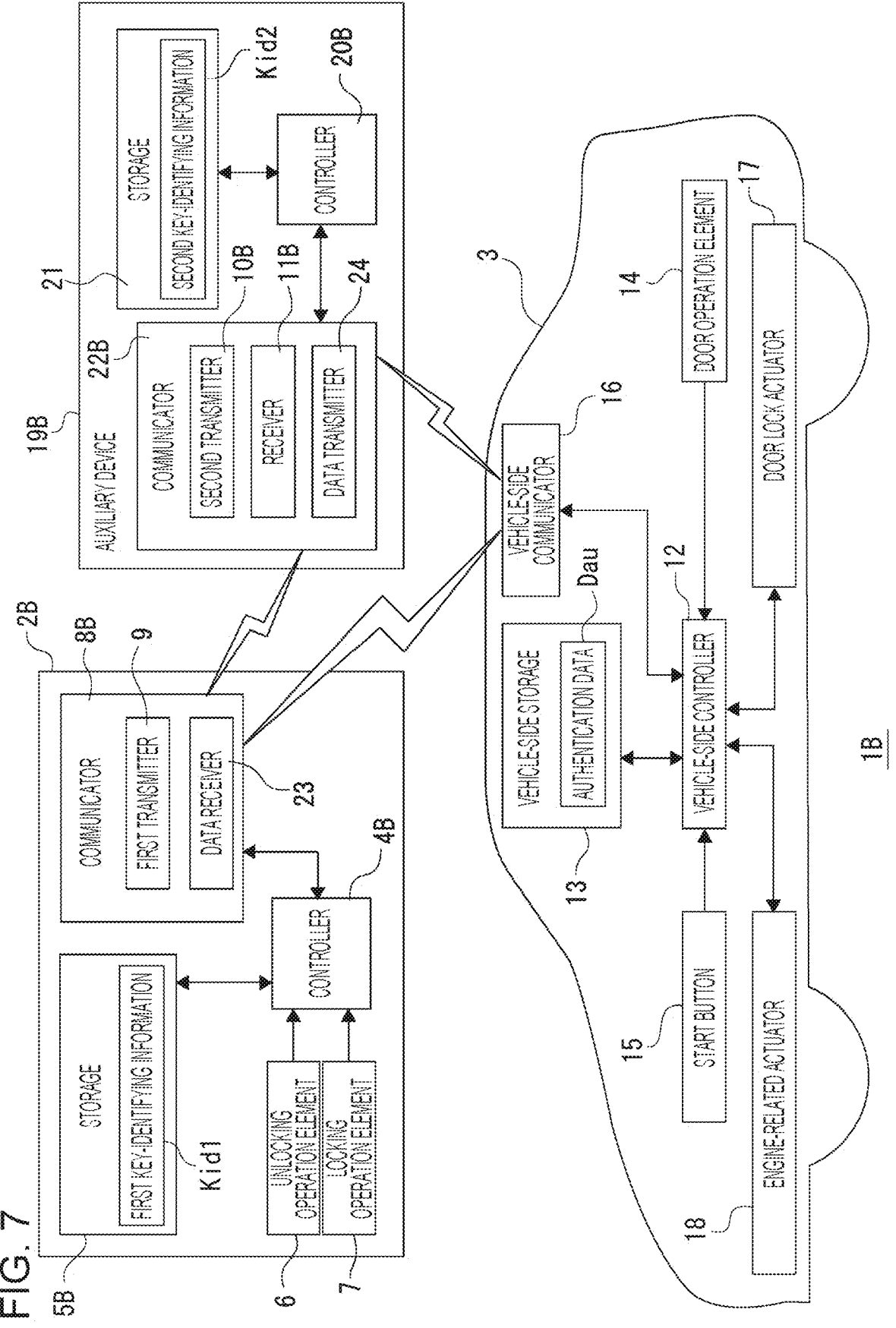
FIG. 7 illustrates an example of a configuration of a vehicle system according to an embodiment.

An example of a configuration of the vehicle system 1B will be described with reference to FIG. 7. Constituents that are the same as or similar to the constituents in the first and second embodiments are denoted by the same signs, and descriptions with regard to such constituents will be omitted as appropriate.

The smart key 2B includes a controller 4B, a storage 5B, an unlocking operation element 6, a locking operation element 7, and a communicator 8B.

The communicator 8B includes a first transmitter 9 and a data receiver 23 but neither a second transmitter 10 nor a receiver 11B.

Namely, the communicator 8B is capable of transmitting a proper signal S1 but incapable of transmitting a fake signal S2 and receiving a signal at the first frequency f1.

Accordingly, the storage 5B stores first key-identifying information Kid1 and not second key-identifying information Kid2.

As depicted in FIG. 2, a transmission start function F1, an electromagnetic-wave intensity acquiring function F2, a transmission stop function F3, an unlocking-signal transmission function F4, and a locking-signal transmission function F5 are implemented in the controller 4B.

The transmission start function F1 is configured to start the first transmitter 9 transmitting the proper signal S1.

The electromagnetic-wave intensity acquiring function F2 is configured to acquire from the auxiliary device 19B a result of measuring the intensity of the received electromagnetic wave having the first frequency f1. Namely, in contrast to the first and second embodiments, the function of measuring the intensity of the received electromagnetic wave having the first frequency f1 is not implemented in the smart key 2B.

The transmission stop function F3, the unlocking-signal transmission function F4, and the locking-signal transmission function F5 serve in the same manner as or similarly to those in the first embodiment, and duplicate description will be omitted.

The functions of transmitting the fake signal S2 and measuring the intensity of the received electromagnetic wave, which are not implemented in the smart key 2B, are implemented in the auxiliary device 19B instead. The auxiliary device 19B may be carried together with the smart key 2B, and, for example, the smart key 2B and the auxiliary device 19B are hung from the same key ring and carried.

The auxiliary device 19B includes a controller 20B, a storage 21, and a communicator 22B.

Figure 8:
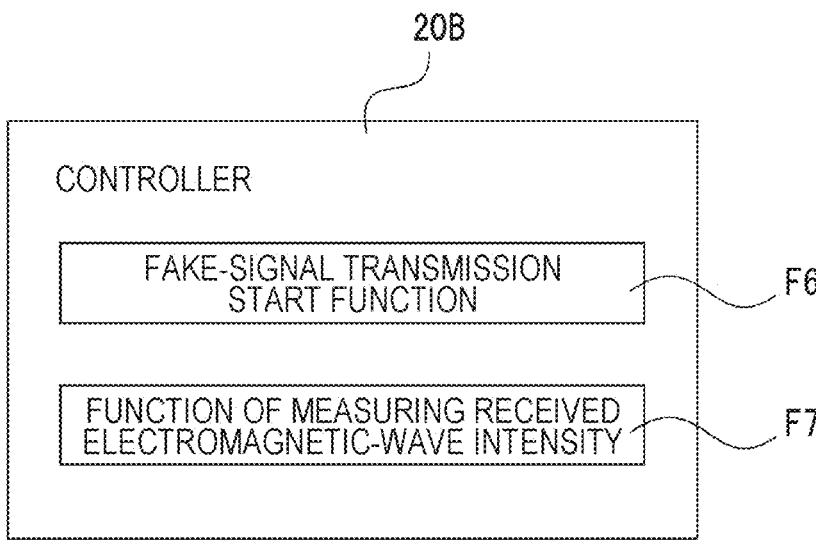
FIG. 8 is a block diagram illustrating functions implemented in a controller in an auxiliary device according to the embodiment.

The fake-signal transmission start function F6 for transmitting the fake signal S2 and a function of measuring received electromagnetic-wave intensity F7 are implemented in the controller 20B (refer to FIG. 8).

The electromagnetic-wave intensity acquiring function F2 implemented in the controller 4 according to the first embodiment provides a measuring function and a function of acquiring a measurement result, and the function of measuring received electromagnetic-wave intensity F7 provides the measuring function separated from the two functions provided by the electromagnetic-wave intensity acquiring function F2.

The storage 21 collectively represents components such as a ROM configured to store a program to be executed by the controller 20B and a RAM to be used as a work area. The controller 20B may include a part of the storage 21.

The controller 20B and the storage 21 are formed, for example, as a single IC chip.

The storage 21 stores the second key-identifying information Kid2 to be used to transmit the fake signal S2.

The communicator 22B includes a second transmitter 10B, a receiver 11B, and a data transmitter 24. The second transmitter 10B is controlled by the controller 20B and is configured to continuously output the fake signal S2 containing the second key-identifying information Kid2.

Namely, in the vehicle system 1B according to the third embodiment, not only the proper signal S1 is transmitted from the smart key 2B but also the fake signal S2 is transmitted from the auxiliary device 19B, leading to a block to a relay attack.

The receiver 11B in the communicator 22B is capable of receiving a radio-frequency electromagnetic wave in a predetermined frequency range including the first frequency f1 used for transmitting the proper signal S1 and the fake signal S2.

The function of measuring received electromagnetic-wave intensity F7 in the controller 20B is configured to measure the intensity of the received electromagnetic wave having the first frequency f1 based on the reception by the receiver 11B.

The data regarding the measured intensity of the received electromagnetic wave is transmitted to the smart key 2B by the data transmitter 24 in the communicator 22B.

The process to be performed by the controller 4B according to the third embodiment is the same as or similar to the process illustrated in FIG. 3. Note that the controller 4B performs a process to cause the transmission of the proper signal S1 alone to start in step S101.

The acquiring process in step S102 is replaced with a process of receiving from the auxiliary device 19B the data regarding the intensity of the received electromagnetic wave.

Figure 9:
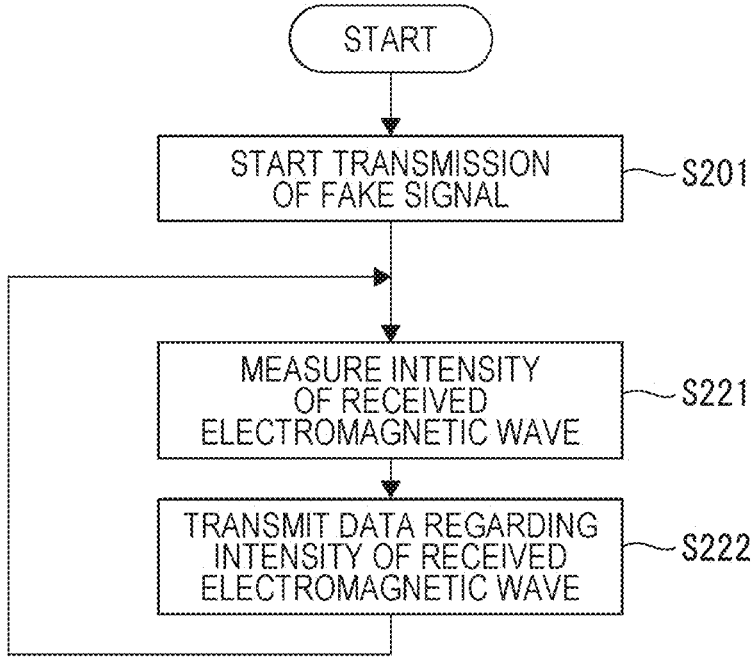
FIG. 9 is a flowchart illustrating an example of a process performed by the controller in the auxiliary device according to the embodiment.

FIG. 9 illustrates an example of a process performed by the auxiliary device 19B.

The controller 20B in the auxiliary device 19B performs a process to cause the transmission of the fake signal S2 to start in step S201 in FIG. 9.

The controller 20B measures (calculates) the intensity of the received electromagnetic wave having the first frequency f1 in step S221.

In step S222, the controller 20B performs a process to transmit to the smart key 2B the data regarding the measured intensity of the received electromagnetic wave.

Subsequently, the controller 20B repeats the processes in step S221 and step S222 alternately.

In the vehicle system 1B according to the embodiment, since the smart key 2B and the auxiliary device 19B are separated from each other, it is unnecessary to implement the function of transmitting the fake signal S2 in the smart key 2B.

Accordingly, the cost of the smart key 2B may be reduced. When the vehicle 3 is replaced with another vehicle, the auxiliary device 19B may continue to be used without a change, leading to cost reduction.

In the examples described above, a single fake signal S2 is provided, but two or more fake signals S2a, S2b, S2c, S2d, . . . may be provided. The fake signals S2a, S2b, S2c, S2d, . . . contain different pieces of second key-identifying information Kid2a, Kid2b, Kid2c, Kid2d, . . . respectively. The pieces of second key-identifying information Kid2a, Kid2b, Kid2c, Kid2d, . . . contained in the fake signals S2a, S2b, S2c, S2d, . . . , respectively, may each be identifying information for which a corresponding vehicle 3 does not exist.

In the examples described above, a transmitter is disposed for each signal to be transmitted, but a single transmitter configured to output a composite signal obtained by combining signals may be disposed.

The transmission of the fake signal S2 may start after the door of the vehicle 3 is locked. Namely, since the transmission of the fake signal S2 does not start before the door is locked, power consumption related to the transmission process may be reduced, and long-term operation of the smart key 2 (2A or 2B) and the auxiliary device 19 (19B) may be achieved.

A reduction in power consumption may reduce the capacity of a battery to be mounted, leading to downsizing of the smart key 2 (2A or 2B) and the auxiliary device 19 (19B).

When the unlocking operation element 6 or the locking operation element 7 included in the smart key 2 (2A or 2B) is pressed, a signal distinct from the proper signal S1 or the fake signal S2 may be transmitted at the first frequency f1.

In such a case, the intensity of the received electromagnetic wave having the first frequency f1 also increases, and the controller 4 (4A or 4B) may perform control to stop the first transmitter 9 from transmitting the proper signal S1.

Since the unlocking control and the locking control of the door are performed in the vehicle 3 at this time in response to receiving the unlocking signal and the locking signal, respectively, stopping the transmission of the proper signal S1 does not cause any inconvenience.

In addition, stopping the transmission of the proper signal S1 even for a fixed period may lead to a reduction in the power consumption by the smart key 2 (2A or 2B).

While the unlocking operation element 6 or the locking operation element 7 is being pressed, the proper signal S1 may continue to be transmitted even when the intensity of the received electromagnetic wave having the first frequency f1 increases.

In the examples described above, the controller 4 (4A or 4B) performs the process to cause the transmission of the proper signal S1 to stop in step S104 in FIG. 3. This process is presented by way of example and not limitation, and the controller 4 (4A or 4B) may perform control to weaken the proper signal S1 or strengthen the fake signal S2.

Consequently, the ability to unlock the door and start the engine may be hampered, or buying time is possible.

The function of transmitting the fake signal S2 is implemented in the vehicle system 1 (1A or 1B) in each embodiment by way of example and not limitation.

For example, the vehicle system 1 (1A or 1B) may consist of a function of transmitting the proper signal S1, a function of measuring the intensity of the received electromagnetic wave having the first frequency f1, a function of determining whether the intensity of the received electromagnetic wave is high, and a function of stopping the transmission of the proper signal S1 based on a comparison result.

However, transmitting the fake signal S2 together with the proper signal S1 may prolong the time it takes to unlock the door in a relay attack.

Consequently, since buying time until the transmission of the proper signal S1 is stopped is possible, the transmission of the proper signal S1 may be stopped before the door is unlocked, or a situation may be created in which the fake signal S2 alone is being transmitted when the engine is to start after the door is unlocked.

In another example distinct from the examples described above, the vehicle 3 may be configured to continuously transmit an electromagnetic wave having the first frequency f1, and a smart key may be configured to reply when entering an area where the smart key may receive the electromagnetic wave from the vehicle 3.

For example, a threshold may be set based on the intensity of the received electromagnetic wave when the smart key properly receives the electromagnetic wave emitted from the vehicle 3, and the transmission of the proper signal S1 may be blocked (that is, the transmission may be stopped) when the intensity of the received electromagnetic wave having the first frequency f1 is equal to or more than the threshold.

The fake signal S2 may or may not be transmitted at this time.

Summarization

As illustrated in the examples described above, a smart key 2 (2A or 2B) serving as an information processing device includes a first transmitter 9, one or more processors (controller 4, 4A, or 4B), and a recording medium (storage 5, 5A, or 5B). The first transmitter 9 is configured to transmit first key-identifying information Kid1 using a radio-frequency electromagnetic wave having a predetermined frequency (first frequency f1), the first key-identifying information Kid1 being linked to a predetermined vehicle (vehicle 3 corresponding to the smart key 2, 2A, or 2B). The recording medium (storage 5, 5A, or 5B) stores a program to be executed by the one or more processors. The program includes one or more instructions configured to cause the one or more processors to perform a process to stop the first transmitter 9 from transmitting the first key-identifying information Kid1 when it is determined that the radio-frequency electromagnetic wave having the predetermined frequency (first frequency f1) has increased in intensity.

Consequently, the transmission of a proper signal S1 is stopped in response to the detection of amplification of the electromagnetic wave, for example, by a relay attack.

Accordingly, unlocking the door and starting the engine in the vehicle 3 by a relay attack is prevented, and the vehicle 3 may be protected from theft.

As illustrated in the first embodiment and the second embodiment, the smart key 2 (2A) serving as the information processing device may include a receiver 11 configured to receive the radio-frequency electromagnetic wave having the predetermined frequency (first frequency f1). The one or more instructions may be configured to cause the one or more processors (controller 4 or 4A) to perform a process (step S102) to measure the intensity of the radio-frequency electromagnetic wave that has the predetermined frequency (first frequency f1) and that is received by the receiver 11.

Namely, the receiver 11 may be disposed in the housing of the smart key 2 (2A). Consequently, the intensity of the received electromagnetic wave may be acquired without using wireless communication, and thus the transmission of the proper signal S1 may be promptly stopped.

Thus, stealing the vehicle 3 may be made more difficult.

As illustrated, for example, in the first embodiment, the smart key 2 serving as the information processing device may include a second transmitter 10 configured to transmit second key-identifying information Kid2 using the radio-frequency electromagnetic wave having the predetermined frequency (first frequency f1), the second key-identifying information Kid2 being unlinked to the predetermined vehicle (vehicle 3 corresponding to the smart key 2).

Since the smart key 2 is allowed to transmit a fake signal S2 together with the proper signal S1, the time it takes to perform an authentication process on the vehicle 3 side in response to receiving the electromagnetic wave having the first frequency f1 may be prolonged.

Consequently, since buying time until the transmission of the proper signal S1 is stopped is possible, the transmission of the proper signal S1 may be stopped before the door is unlocked, or a situation may be created in which the fake signal S2 alone is being transmitted when the engine is to start after the door is unlocked.

As illustrated in the embodiments above, in the smart key 2 (2A or 2B) serving as the information processing device, the one or more instructions may be configured to cause the one or more processors (controller 4, 4A, or 4B) to perform a process (step S104) to cause the transmission of the first key-identifying information Kid1 to stop when it is determined, based on a comparison of a measured intensity of the electromagnetic wave with a threshold, that the electromagnetic wave having the predetermined frequency (first frequency f1) has increased in intensity.

Consequently, a simple process involving a small process load may protect the vehicle 3 from theft.

As illustrated in the embodiments above, in the smart key 2 (2A or 2B) serving as the information processing device, the one or more instructions may be configured to cause the one or more processors (controller 4, 4A, or 4B) to perform a process (step S104) to cause the transmission of the first key-identifying information Kid1 to stop when it is determined, based on a comparison of a most recently measured intensity of the electromagnetic wave with an intensity of the electromagnetic wave measured a predetermined time earlier, that the electromagnetic wave having the predetermined frequency (first frequency f1) has increased in intensity.

Consequently, even when a transmitted output of the proper signal S1 changes due to a factor such as deterioration of the smart key 2 (2A or 2B) over time, amplification of the electromagnetic wave by a relay attack may be properly detected, and the vehicle 3 may be protected from theft.

A program according to an embodiment of the disclosure is stored in a recording medium (storage 5, 5A, or 5B) and is executed by one or more processors (controller 4, 4A, or 4B). The program is configured to cause the one or more processors (controller 4, 4A, or 4B) to perform a process of transmitting first key-identifying information Kid1 using a radio-frequency electromagnetic wave having a predetermined frequency (first frequency f1), the first key-identifying information Kid1 being linked to a predetermined vehicle (vehicle 3 corresponding to a smart key 2, 2A, or 2B), and a process of causing the transmission of the first key-identifying information Kid1 to stop when it is determined that the radio-frequency electromagnetic wave having the predetermined frequency has increased in intensity.

An information processing method according to an embodiment of the disclosure is configured to be performed by a smart key 2 (2A or 2B) serving as an information processing device. The information processing method includes a process of transmitting first key-identifying information Kid1 using a radio-frequency electromagnetic wave having a predetermined frequency (first frequency f1), the first key-identifying information Kid1 being linked to a predetermined vehicle (vehicle 3 corresponding to the smart key 2, 2A, or 2B), and a process of causing the transmission of the first key-identifying information Kid1 to stop when it is determined that the radio-frequency electromagnetic wave having the predetermined frequency has increased in intensity.

Such a program and an information processing method may provide various operations and effects described above.

According to the embodiments of the disclosure, the possibility of a vehicle being stolen may be reduced.

The controller 4 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 4 including the transmission start function F1, the electromagnetic-wave intensity acquiring function F2, the transmission stop function F3, the unlocking-signal transmission function F4, and the locking-signal transmission function F5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An information processing device comprising:
a first transmitter configured to transmit first key-identifying information using a radio-frequency electromagnetic wave having a predetermined frequency, the first key-identifying information being linked to a predetermined vehicle such that an operation of the predetermined vehicle is allowed based on the first key-identifying information;
a second transmitter configured to transmit a fake signal using the radio-frequency electromagnetic wave having the predetermined frequency, the fake signal comprising second key-identifying information being unlinked to the predetermined vehicle such that the operation of the predetermined vehicle is not allowed based on the second key-identifying information;
one or more processors; and
a recording medium storing a program configured to be executed by the one or more processors,
wherein the program comprises one or more instructions configured to cause the one or more processors to perform a process to (i) stop the first transmitter from transmitting the first key-identifying information and (ii) continue to cause the second transmitter to transmit the fake signal, when it is determined that the radio-frequency electromagnetic wave having the predetermined frequency has increased in intensity.

2. The information processing device according to claim 1, further comprising:
a receiver configured to receive the radio-frequency electromagnetic wave having the predetermined frequency,
wherein the one or more instructions are configured to cause the one or more processors to perform a process to measure an intensity of the radio-frequency electromagnetic wave that has the predetermined frequency and that is received by the receiver.

3. The information processing device according to claim 1, wherein the one or more instructions are configured to cause the one or more processors to perform a process to stop the first transmitter from transmitting the first key-identifying information when it is determined, based on a comparison of a measured intensity of the radio-frequency electromagnetic wave with a threshold, that the radio-frequency electromagnetic wave having the predetermined frequency has increased in intensity.

4. The information processing device according to claim 2, wherein the one or more instructions are configured to cause the one or more processors to perform a process to stop the first transmitter from transmitting the first key-identifying information when it is determined, based on a comparison of a measured intensity of the radio-frequency electromagnetic wave with a threshold, that the radio-frequency electromagnetic wave having the predetermined frequency has increased in intensity.

5. The information processing device according to claim 1, wherein the one or more instructions are configured to cause the one or more processors to perform a process to stop the first transmitter from transmitting the first key-identifying information when it is determined, based on a comparison of a most recently measured intensity of the radio-frequency electromagnetic wave with an intensity of the radio-frequency electromagnetic wave measured a predetermined time earlier, that the radio-frequency electromagnetic wave having the predetermined frequency has increased in intensity.

6. The information processing device according to claim 2, wherein the one or more instructions are configured to cause the one or more processors to perform a process to stop the first transmitter from transmitting the first key-identifying information when it is determined, based on a comparison of a most recently measured intensity of the radio-frequency electromagnetic wave with an intensity of the radio-frequency electromagnetic wave measured a predetermined time earlier, that the radio-frequency electromagnetic wave having the predetermined frequency has increased in intensity.

7. The information processing device according to claim 1, wherein the one or more instructions are configured to cause the one or more processors to perform a process to resume the first transmitter transmitting the first key-identifying information when a predetermined time has elapsed after the first transmitter is stopped from transmitting the first key-identifying information.

8. The information processing device according to claim 1, wherein the one or more instructions are configured to cause the one or more processors to perform a process to resume the first transmitter transmitting the first key-identifying information when it is determined that the intensity of the radio-frequency electromagnetic wave having the predetermined frequency is no longer high.

9. The information processing device according to claim 1, wherein the one or more instructions are configured to cause the one or more processors to perform a process to stop the first transmitter from transmitting the first key-identifying information when the intensity of the radio-frequency electromagnetic wave is determined to be high and at least one of the first key-identifying information and the second key-identifying information is contained in a signal on the radio-frequency electromagnetic wave.

10. The information processing device according to claim 1, wherein the one or more instructions are configured to cause the one or more processors to perform a process to at least one of (i) cause the first transmitter to transmit a weakened first key-identifying information and (ii) cause the second transmitter to transmit a strengthened fake signal, when it is determined that the radio-frequency electromagnetic wave having the predetermined frequency has increased in intensity.

11. The information processing device according to claim 1, wherein the second transmitter is configured to transmit two or more fake signals, each fake signal containing different second key-identifying information.

12. The information processing device according to claim 1, wherein a time to start transmitting the first key-identifying information differs from a time to start transmitting the fake signal.

13. The information processing device according to claim 1, wherein the one or more instructions are configured to cause the second transmitter to start transmitting the fake signal after a door of the predetermined vehicle is locked.

\* \* \* \* \*